US011896994B2

(12) United States Patent
Kappel

(10) Patent No.: US 11,896,994 B2
(45) Date of Patent: Feb. 13, 2024

(54) COATING DEVICE

(71) Applicant: Contiweb B.V., Boxmeer (NL)

(72) Inventor: Sjoerd Kappel, Boxmeer (NL)

(73) Assignee: Contiweb B.V., Boxmeer (NL)

( * ) Notice: Subject to any disclaimer, the term of this patent is extended or adjusted under 35 U.S.C. 154(b) by 0 days.

(21) Appl. No.: 17/795,347

(22) PCT Filed: Jan. 8, 2021

(86) PCT No.: PCT/IB2021/050112
§ 371 (c)(1),
(2) Date: Jul. 26, 2022

(87) PCT Pub. No.: WO2021/152406
PCT Pub. Date: Aug. 5, 2021

(65) Prior Publication Data

US 2023/0056116 A1 Feb. 23, 2023

(30) Foreign Application Priority Data

Jan. 28, 2020 (NL) .................................... 2024775

(51) Int. Cl.
*B05C 1/08* (2006.01)
*B05C 11/10* (2006.01)
*B41F 19/00* (2006.01)

(52) U.S. Cl.
CPC .......... *B05C 1/0813* (2013.01); *B05C 1/0878* (2013.01); *B05C 11/1005* (2013.01); *B05C 11/1047* (2013.01); *B41F 19/001* (2013.01)

(58) Field of Classification Search
CPC ... B05C 1/0813; B05C 1/0821; B05C 1/0847; B05C 1/0852; B05C 1/0878;
(Continued)

(56) References Cited

U.S. PATENT DOCUMENTS 3,411,442 A * 11/1968 Muhlich .................. B41F 7/40 101/148
3,490,732 A * 1/1970 Leroy .................... F16K 15/14 251/5

(Continued)

FOREIGN PATENT DOCUMENTS

EP 2503425 A2 9/2012
GB 2077629 A 12/1981
WO WO2019057341 * 3/2019

OTHER PUBLICATIONS

International Search Report and Written Opinion, PCT Application No. PCT/IB2021/050112, dated Jun. 4, 2021 (8 pages).

*Primary Examiner* — Laura Edwards
(74) *Attorney, Agent, or Firm* — Occhiuti & Rohlicek LLP

(57) ABSTRACT

A coating device for supplying a liquid to a substrate, particularly in the form of an optionally printed web, foil, strip or sheet, comprises a reservoir for holding a quantity of liquid. A coating assembly is provided which is able and configured to take liquid from the reservoir and transfer it to the substrate. A supply delivers the liquid into the reservoir during operation. The supply is controllable and is able to lead a constant liquid flow into the reservoir. The reservoir is provided with a level detector capable and configured to detect a liquid level in the reservoir. Provided between the level detector tools and the coating assembly is a control which controls the coating assembly during operation on the basis of a detection (LS) of the liquid level in the reservoir in order to maintain the liquid level at a fixed value.

21 Claims, 2 Drawing Sheets

(58) Field of Classification Search
CPC ............... B05C 1/0891; B05C 11/1005; B05C 11/1047; B05C 1/0882; B05C 1/0834; B05C 11/101; B41F 19/001; B41F 23/08; B41F 31/06; B41F 31/022
USPC ........ 118/712, 694, 222, 243, 255, 259, 263
See application file for complete search history.

(56) References Cited

U.S. PATENT DOCUMENTS

| | | | | | |
|---|---|---|---|---|---|
| 4,961,964 | A * | 10/1990 | Dahlgren | B41M 7/0027 427/428.15 |
| 2001/0027747 | A1 * | 10/2001 | Quetti | B05C 1/0834 118/244 |

* cited by examiner

COATING DEVICE

CROSS REFERENCE TO RELATED APPLICATIONS

This application is a 371 National Phase application of PCT Application No. PCT/IB2021/050112, filed Jan. 8, 2021, which claims the benefit of the filing date of Netherlands Application No. 2024775, filed Jan. 28, 2020, the contents of which are hereby incorporated by reference in their entirety.

The present invention relates to a coating device for supplying a liquid to a substrate, particularly in the form of an optionally printed web, foil, strip or sheet, comprising: a reservoir for holding a quantity of liquid, coating means which are able and configured to take liquid from the reservoir and transfer it to the substrate, and supply means for delivering the liquid into the reservoir during operation.

The invention relates particularly here to such a coating device, also referred to below as coater, for application on a substrate of for instance paper, cardboard, textile or plastic for or of a printing device for the purpose of depositing, single-sided or double-sided, a uniform coating of the relevant liquid over a whole surface of the substrate. Digital printing techniques, such as inkjet printing, which make use of water-based inks, particularly require a customized treatment of the paper with a specific primer in order to achieve and maintain an acceptable printing quality at an acceptable level of ink consumption.

With a view thereto, printing companies can buy pretreated inkjet paper directly from their paper supplier, but are in that case often faced with a considerable additional charge. Moreover, such a more or less uniformly pretreated inkjet paper is often not optimally adapted to the printing process to be applied, which may be detrimental to the printing quality.

It is an alternative to provide bare, untreated paper with a uniform coating prior to the printing process, which coating can in that case be optimally adapted to the printed material and which can result in a considerable saving in paper costs. A coating device of the type described in the preamble can be utilized for this purpose. The use of such a coating device, usually referred to as coater, allows the use of accurately selected liquids to thereby provide the paper before or after the printing process with respectively a suitable primer or glossy layer over the whole surface. This generally results in an optimal printing quality and lower ink consumption.

Commercial printed materials, such as glossy magazines, product brochures and other high-end commercial printed materials, particularly require a high-gloss, luxurious appearance which can thus be provided immediately following the printing process by covering with a suitable glossy coating (varnish). This is not just limited to printed materials on the basis of water-based inks but, irrespective of the applied printing technique, can for instance also be applied for offset printing. Such a glossy coating applied afterwards moreover protects the paper against mechanical load, for instance when it is folded, and against the influence of atmospheric/climatological conditions to which the printed material is exposed.

A device of the type described in the preamble which serves for this purpose is for instance known from American U.S. Pat. No. 4,961,964. The coating device described therein is used to apply water or a suitable coating to a paper web from a printing device. The known coating device comprises for this purpose coating means in the form of a roller assembly which is able and configured to take liquid from the reservoir and transfer it to the substrate. The known roller assembly comprises a take-up roller in contact with the liquid to be applied and a supply roller in contact with the paper web, which is guided over the supply roller at a web speed. Situated between the take-up roller and the supply roller is an intermediate roller which is in contact with both the take-up roller and the supply roller. Each of the rollers is suspended rotatably about a central axis thereof. During operation the take-up roller is in rotating contact with the liquid in the reservoir and liquid is thereby taken up from the reservoir. The intermediate roller is in rotating contact with the take-up roller and takes off a controlled quantity from the take-up roller during operation. The supply roller is in turn also in rotating contact with the intermediate roller so as to take on this quantity therefrom and then apply it to the substrate.

For many practical applications it is desirable or even necessary here for the liquid to be deposited on the substrate in the form of a continuous, uniform layer with an accurately determined layer thickness. With a view hereto it is known to apply a so-called anilox roller in the described roller assembly. An anilox roller is a hard cylinder, usually of steel or aluminium, which is coated with an industrial ceramic material, the surface of which comprises millions of very fine small cavities (indentations) referred to as anilox cells, or cells for short. The number, the size and the geometry of the anilox cells very accurately determine the quantity of liquid which the anilox roller will take up and can then supply.

Two systems are here common in practice. In the so-called doctoring system an anilox roller is on one side in direct contact with the liquid to be applied and on the other side in contact with the supply roller whereby the liquid is deposited on the substrate. Liquid is scraped off the anilox roller using blades which are provided for this purpose and lie closely-fittingly against the surface of the anilox roller, and is fed back to the reservoir. In the so-called metering system a so-called fountain roller is utilized as take-up roller. On one side this is in direct contact with the liquid to be applied and on the other side it lies against an anilox roller which takes off an accurately determined quantity of liquid from the fountain roller in that it squeezes the fountain roller. Excess liquid is fed back. The anilox roller then transfers the taken-off quantity of liquid to the supply roller which is in contact with the substrate in order to supply the liquid thereto.

A particularly accurate dosing of the quantity of liquid which will eventually be deposited on the substrate, and thereby of the degree of coverage, is thus possible in practice. A drawback is however that such anilox rollers are relatively expensive and must be adapted specifically in accordance with a liquid to be applied and desired film thickness.

The printing device increasingly often comprises a digital printer for sheets which is capable of production in flexible manner and in limited runs. An emerging market is here that of printing packagings. The printer must here be able to quickly make changes in at least parts of the printed patterns, sometimes even after each printing. Compared to the relatively long and regular print runs with traditional web-fed printing presses, printed material from a sheet-fed digital printer is therefore often characterized by an irregular output and relatively short runs. This results in regular interruptions of the printing process for adjustment of the printer, which often also necessitates adjustment to greater or lesser extent of the equipment used before and/or after the printer.

An example hereof is for instance a change in a coating to be applied, and particularly in a desired film thickness thereof. In practice this often means that an anilox roller applied in the coating device must be exchanged with a view thereto in order to thus provide a changed cell pattern, wherein for instance the shape, density and depth of the cells is adjusted and adapted to the liquid to be applied and the desired film thickness. This is particularly time-consuming, which already results in a loss of productivity and efficiency. Different anilox rollers must moreover be kept in storage. Not only do provisions have to be made therefor; this furthermore results in considerable costs because of the simple fact that anilox rollers are relatively expensive. All in all, this results in a considerable increase of the printing costs.

The present invention has for its object, among others, to provide a coating device which at least significantly obviates these and other drawbacks by providing a coating device which produces a uniform layer thickness and, if desired, allows herein a variation in coating thickness during operation.

In order to achieve the intended object a coating device of the type stated in the preamble has the feature according to the invention that the supply means comprise controllable supply means which are able and configured to lead a constant liquid flow into the reservoir, that the reservoir is provided with level detecting means which are able and configured to detect a height of a liquid level in the reservoir, and that provided between the level detecting means and the coating means is a control which continuously controls the coating means during operation on the basis of the detection of the liquid level in the reservoir by the level detecting means.

In a particular embodiment the coating device according to the invention has the feature here that the control controls the coating means on the basis of a detection of the liquid level in the reservoir by the level detecting means in order to maintain the liquid level (s) at a fixed flow rate, ds/dt=constant, in time. This flow rate can particularly be zero. A preferred embodiment of the coating device according to the invention therefore has the feature that the control controls the coating means on the basis of a detection of the liquid level in the reservoir by the level detecting means in order to maintain the liquid level (s) at a fixed value, s=constant, in time.

Volumetric control on the basis of the desired film thickness and coverage of the liquid to be deposited on the substrate thus takes place in the coating device on the supply side of the liquid in all cases. The invention is here based on the insight that it follows from a constant liquid level or flow rate in the reservoir with a constant supply of liquid that the take-off of liquid and transfer to the substrate by the coating means will also be constant. The value (SP) for the liquid flow to be set then follows directly, on the basis of the desired coverage (d), substrate width (b) and web speed (v), from one of the following formulas, or a derivative thereof:

$$SP[\text{g/s}]=d[\text{g/m}^2]\times b[\text{m}]\times(v)[\text{m/s}]$$

or $$SP[\text{ml/s}]=d[\text{ml/m}^2]\times b[\text{m}]\times(v)[\text{m/s}]$$

On the basis of an entered setting or adjustment (setpoint SP) for the liquid flow an accurately determined degree of coverage (FD) of the substrate then ipso facto follows in the case of a constant level in the reservoir, a constant web speed (v) and a fixed substrate width (b). During operation the coating means are controlled on the basis of a liquid level detected by the level means such that this liquid level is maintained at a fixed value or a fixed reduction rate, whereby a constant, uniform degree of coverage, i.e. layer thickness, is obtained.

A particular embodiment of the coating device according to the invention has the feature that the coating means comprise a take-up roller having over a periphery thereof a take-up surface intended and configured to enter into contact with the liquid and take up a quantity thereof during operation, and that the take-up roller is driven rotatably about its central axis and that the control is operatively coupled to a drive of the take-up roller so as to impart thereto a rotation speed. By increasing or reducing the rotation speed of the take-up roller more or less liquid can be taken up from the reservoir in relatively simple manner. In the case of an unintended increase in the detected liquid level in the reservoir an increase of the rotational speed of the take-up roller can bring the liquid level back to its original value to be maintained. Vice versa, in the case of a detected drop in the liquid level, the rotational speed can be reduced accordingly. The control which is provided in the coating device monitors this and controls this.

In a further particular embodiment the coating device according to the invention has the feature that the take-off means comprise a counter-roller having over a periphery thereof a take-off surface, which counter-roller extends at least substantially parallel to the take-up roller and is at least substantially in contact with the take-up roller such that the take-off surface of the counter-roller co-acts with the take-up surface of the take-up roller during operation in order to take off a quantity of liquid therefrom, that each of the take-up roller and the counter-roller is driven rotatably about its central axis and that the control is operatively coupled to a drive of at least one of the take-up roller and the counter-roller and imposes an adaptation between a rotation speed of the take-up roller and a rotation speed of the counter-roller, particularly in the form of mutual difference in peripheral speed.

It is otherwise noted that, unless the contrary is expressly stated, where the present invention refers to the peripheral speed of a roller this is always understood to mean the absolute value thereof, although in practice successive rollers will often be driven in mutually opposite directions. As the control between the take-up roller and the counter-roller thus imparts a positive or negative difference in peripheral speed a mutual slip is created, whereby more or less liquid is transferred from the take-up roller to the counter-roller. An excess quantity of liquid which may have been taken up from the reservoir by the take-up roller is fed back to the reservoir. The control, which is provided in the coating device, monitors the liquid level in the reservoir and optionally controls this difference in speed in order to maintain a constant liquid level in the reservoir.

In a preferred embodiment the coating device according to the invention is characterized in that provided between the take-up roller and the counter-roller is at least one actuator which, at least during operation, applies a contact pressure between the take-up surface and the take-off surface, and that the control is operatively coupled to the at least one actuator in order to apply a mutual contact pressure between the take-up roller and the counter-roller. For a transfer of liquid between successive rollers which are in mutual contact with their peripheral surface a contact pressure is also a factor, this in addition to a possible difference in speed therebetween. At a determined relative speed the quantity of transferred liquid can be plotted as a function of this contact pressure. The control provided in the coating device monitors the liquid level in the reservoir and optionally controls this squeezing pressure by driving the actuator to greater or lesser extent in order to thus maintain a constant liquid level in the reservoir.

In order to transfer the liquid to the substrate over a whole surface (full-surface) a further preferred embodiment of the coating device has the feature according to the invention that the coating means comprise a supply roller having over a periphery thereof a supply surface which is able and configured to enter into contact with the substrate and supply a quantity of the liquid thereto during operation, and that the supply roller is driven rotatably about its central axis. The supply roller can serve as counter-roller with which the take-up roller is in contact. An increase or decrease in rotational speed of the supply roller results in more or less liquid being taken from the reservoir. The control of the drive of the supply roller comprises a control of this rotational speed, which provides the control with an additional parameter whereby the liquid in the reservoir is maintained at a constant liquid level.

A further particular embodiment of the coating device is characterized in this latter respect in that transport means are provided to guide the substrate over the supply surface of the supply roller at a web speed, and that the control is operatively coupled to at least one of a drive of the supply roller and the transport means and imposes an adaptation between a rotation speed of the supply roller and the web speed of the substrate. More or less slip is thus imparted between the supply surface of the supply roller and the substrate, whereby a layer thickness of the applied liquid can also be influenced. The control can also control on the basis hereof in order to maintain a fixed liquid level in the reservoir, so that the supplied layer thickness actually corresponds to the desired layer thickness.

A further preferred embodiment of the coating device has the feature according to the invention that the coating means comprise a take-up roller having over a periphery thereof a take-up surface which is intended and configured to enter into contact with the liquid and take up a quantity thereof during operation, that the coating means comprise a supply roller having over a periphery thereof a supply surface which is able and configured to enter into contact with the substrate and supply a quantity of the liquid thereto during operation, that the supply roller is coupled for liquid transfer to the take-up roller with interposing of at least one intermediate roller, that the supply roller extends at least substantially parallel to the intermediate roller and is placed at least substantially thereagainst, such that the supply surface of the supply roller co-acts with a peripheral surface of the intermediate roller during operation in order to take on a quantity of liquid therefrom. Because the supply roller thus takes on the liquid from the take-up roller with interposing of at least one intermediate roller, a particularly accurate and uniform dosing of the liquid over the supply surface of the supply roller is achieved. The control on the basis of a fixed liquid level in the reservoir ensures that this dosage is precisely adapted to a layer thickness to be applied to the substrate. For the intermediate roller use can here be made of a normal, smooth roller, or an anilox roller can be opted for.

A particular preferred embodiment of the coating device is here characterized in that each of the supply roller and the intermediate roller is driven rotatably about its central axis and that the control is coupled to a drive of at least one of the supply roller and the intermediate roller, and imposes an adaptation between a rotation speed of the supply roller and a rotation speed of the intermediate roller, particularly in the form of a mutual difference in peripheral speed. The control is operatively coupled to at least one of the drives of the two rollers in order to thus optionally impart a difference between the peripheral speeds of the co-acting contact surfaces thereof. More or less liquid transport from the one to the subsequent roller can thus be (fine-)tuned. The control, which is provided in the coating device, monitors the liquid level in the reservoir and optionally controls this difference in speed in order to maintain a constant liquid level in the reservoir.

In a further particular preferred embodiment the coating device has the feature according to the invention that provided between the supply roller and the intermediate roller is at least one actuator which, at least during operation, applies a contact pressure between the supply surface and the peripheral surface, and that the control is coupled to the at least one actuator in order to apply a mutual contact pressure between the supply roller and the intermediate roller. In this case the control also provides for a control of the mutual squeezing pressure of successive rollers. By controlling the squeezing pressure between the intermediate roller and the supply roller here, more or less liquid will be transferred to the supply roller and then deposited on the substrate. The control, which is provided in the coating device, monitors the liquid level in the reservoir and optionally adjusts the contact pressure between the intermediate roller and the supply roller in order to maintain a constant liquid level in the reservoir.

The present invention allows the dosage to be adjusted, if desired, without rollers having to be switched for this purpose. For this purpose the supply means are moved to an accordingly lower or higher level, after which the control adjusts the coating means in order to nevertheless keep the liquid level in the reservoir constant or at a constant flow rate. The dosage can thus be increased or reduced within a relatively wide range without taking the device out of operation.

A further preferred embodiment of the coating device according to the invention has the feature that the take-up roller and the supply roller comprise at respectively the take-up surface and supply surface a relatively soft top layer, particularly a polymer top layer, more particularly a polymer top layer of optionally natural rubber, and that the intermediate roller comprises a smooth peripheral surface of metal, particularly of steel, more particularly of stainless steel. According to the invention, such a smooth intermediate roller is enough to obtain a particularly constant and accurate dosing of the liquid over the substrate and, if desired, vary the layer thickness thereof.

An alternative preferred embodiment of the coating device according to the invention has the feature that the take-up roller and the supply roller comprise at respectively the take-up surface and supply surface a relatively soft top layer, particularly a polymer top layer, more particularly a polymer top layer of optionally natural rubber, and that the intermediate roller comprises a hard peripheral surface, particularly of ceramic material or steel, with a pattern of indentations. This intermediate roller comprises particularly an anilox roller and serves here to obtain a further coating accuracy, particularly in the case of liquids that are difficult to apply.

Finally, the layer thickness of the applied liquid on the substrate is determined by the flow rate of the liquid flow by the supply means and possible reduction rate in the reservoir. In respect of the supply means, a further particular embodiment of the coating device has the feature that the supply means comprise a controllable pump, particularly a volumetrically controllable pump. By operating the pump at a higher or lower flow rate the layer thickness can thus be imparted. This can be set manually or imparted electronically, particularly from the control. For this purpose a further particular embodiment of the coating device according to the invention has the feature that the controllable pump is operatively coupled to the control and is controlled thereby.

In respect of the supply means an alternative particular embodiment of the coating device has the feature that the supply means comprise a controllable constriction in a supply conduit to the reservoir. By throttling the constriction to greater or lesser extent, the layer thickness can be varied. This can be set manually, by adjusting the constriction, or electronically, particularly from the control. For this purpose a further particular embodiment of the coating device according to the invention has the feature that the controllable constriction is provided with a drive which is operatively connected to the control and is controlled thereby.

An accurate and continuous monitoring of the liquid level in the reservoir and feedback thereof to the control is of great importance. For this purpose a particular embodiment of the coating device according to the invention is the feature that the level detecting means comprise at least one sensor from a group comprising an ultrasonic sensor, an optical sensor, a magnetic sensor, a weight sensor and a float. It is possible with a float, as with an ultrasonic, optical or magnetic sensor, to monitor the position of the liquid surface in the reservoir more or less directly. A weight sensor can be utilized in gravimetric manner and monitors for instance an overall weight of the reservoir. As long as this is constant, the liquid level therein will also be at a fixed value.

The invention will be further elucidated hereinbelow with reference to an exemplary embodiment and an accompanying drawing. In the drawing.

It is otherwise noted here that the figures are purely schematic and not always drawn to (the same) scale. Some dimensions in particular may be exaggerated to greater or lesser extent for the sake of clarity. Corresponding parts are designated in the figures with the same reference numeral.

Figure 1:
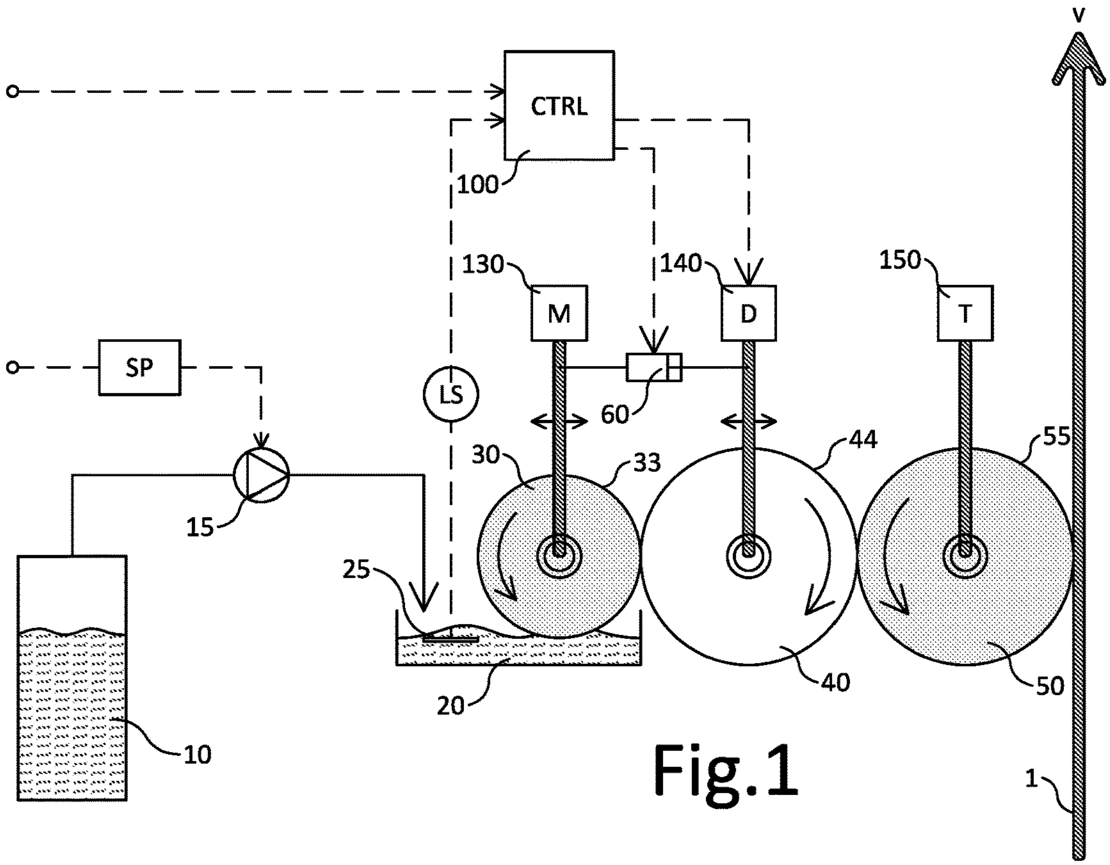
FIG. 1 shows a first exemplary embodiment of the coating device according to the invention.

FIG. 1 shows schematically an embodiment of the coating device according to the invention, whereby a liquid can be deposited full-surface on a substrate 1. In this example use is made for the substrate of a paper web 1 which is brought into contact with the coating device at a considerable web speed (v). Instead of such a continuous web, the substrate can however also comprise individual sheets or strips of paper or cardboard, or be formed by a plastic foil.

The example relates for instance to a coater which can be utilized in a printing line of a printing company, wherein the coater applies for instance a primer to the paper prior to the printing process, or provides the printed material with a fixing layer over the whole surface afterwards in order to fix the ink and/or to add gloss. An aqueous silicone-based solution or suspension can particularly be applied for this purpose, this moreover providing for a rewetting of the printed material following forced drying thereof.

The shown coating device can both be applied on its own as separate station or apparatus, and be integrated into one of the other stations in the printing line. Although only single-sided coating means are shown in the figure, optionally identical coating means can also be applied in double-sided manner in order to simultaneously provide both sides of the substrate with optionally the same coating. In that case the substrate is advantageously received between the two coating means; otherwise a usually smooth counter-roller, not further shown here, will be applied on the back side of the substrate in order to provide counter-pressure.

The liquid to be applied is drawn from a tank 10 and carried into a reservoir 20 by means of a pump 15 with conduits which is provided for this purpose. This is an accurately controllable volumetric pump 15 with an adjustable pump flow rate. A desired volume to be pumped per unit of time of the pump 15 can be set manually on or at the pump by a corresponding setting of the pump's own pump control or be imparted electronically from a controller 100 to the pump. In the outgoing conduit of pump 15 which leads to the reservoir a flow sensor can optionally also be applied for the purpose of monitoring and controlling the set liquid flow. The output signal of such a flow sensor is in that case generated to the control 100 so as to be processed therein.

Tank 10 comprises for instance a supply tank in which a large quantity of the liquid is held, but can for instance also comprise a mixing container in which a processable quantity of a liquid mixture or a suspension of different components was prepared, or a buffer container coupled thereto. A sufficient quantity of liquid, from which the reservoir 20 can be continuously replenished, is held in tank 10 in all cases. In or at the reservoir is situated a level detector 25 whereby a current liquid level in reservoir 20 is constantly detected and generated to controller 100 in electronic form as signal LS.

The level detector comprises for instance a float on the liquid surface to which an electronic sensor is coupled, or an acoustic or optical sensor whereby the liquid surface is sensed. The liquid level in reservoir 20 can also be monitored gravimetrically by continuously determining a weight of the liquid-filled reservoir 20 using an electronic weight sensor placed at or under reservoir 20 for this purpose. For additional reliability, different level detectors can be combined with each other and the electronic output signals thereof can be exchanged with controller 100 so that the relevant values can be compared to each other and optionally averaged.

The coating device further comprises coating means whereby the liquid from reservoir 20 is transferred to substrate 1. These means comprise at least a take-up roller 30 which is suspended rotatably about a central axis and is provided with a drive 130. Drive 130 comprises an electric motor with a controllable rotational speed whereby a counter-clockwise rotation is imparted to the take-up roller, as shown schematically with an arrow in the figure. Take-up roller 30 is hereby with a take-up surface 33 in continuous rotating contact with the liquid in reservoir 20 so as to take up a determined quantity thereof. The take-up roller comprises for instance a cylindrical core of aluminium or steel, which is covered with a top layer of optionally natural rubber. The rubber top layer provides the take-up surface 33 and increases the capacity of the take-up roller to take up liquid.

Placed parallel to the take-up roller is a rotatably driven intermediate roller 40 which is likewise provided with a controllable drive 140 and serves as counter-roller to the take-up roller 30. Intermediate roller 40 is for instance manufactured wholly from stainless steel, for instance chrome steel or chrome-vanadium steel, and has a smooth surface which provides the peripheral surface 44. The drive of intermediate roller 40 also comprises an electric motor 140 with a controllable rotational speed. This drive 140 is operatively coupled to controller 100, which is thus able to impart a rotational speed to intermediate roller 40. Intermediate roller 40 rotates in clockwise direction here, as shown schematically with an arrow in the figure. In practice intermediate roller 40 is operated at a considerably higher peripheral speed than take-up roller 30. In practice this difference in speed can be adjusted in variable manner from the controller, to for instance an order of magnitude of a factor of ten.

Placed between the rotation shafts of take-up roller 30 and intermediate roller 40 is a linear actuator 60 in the form of a hydraulic cylinder. This actuator 60 pulls the two rollers 30, 40 against each other with a controlled contact pressure. This results in a liquid-exchanging contact between the two rollers 30, 40, whereby liquid, once it has been taken up from the reservoir by take-up roller 30, is transferred from take-up surface 33 to a peripheral surface 44 of intermediate roller 40. Any excess liquid which was not taken off is fed back to reservoir 20 by take-up roller 30.

The degree to which liquid is thus taken off by intermediate roller 40 from take-up roller 30 depends on a possible mutual difference in speed between the two rollers 30, 40 and particularly on the contact pressure imparted by actuator 60. The greater this pressure, the smaller the clearance between the two rollers 30, 40, and thereby the film thickness of the liquid which is taken over onto intermediate roller 40. Both the drive of intermediate roller 40 and actuator 60 is operatively coupled to controller 100, whereby the liquid transfer from the take-up roller to the intermediate roller can be controlled at least substantially wholly by controller 100.

Received parallel to and in contact with the intermediate roller is a supply roller 50. On one side, supply roller 50 is with a supply surface 55 in rotating contact at its periphery with intermediate roller 40 and on the other side it maintains a somewhat dragging contact with substrate 1. Supply roller 50 is also provided with a drive 150 in the form of an electric motor with a controllable rotational speed, which imparts a counter-clockwise rotation to supply roller 50, as shown schematically with an arrow in the figure. In practice the peripheral speed of supply roller 50 is adapted to the web speed (v) of the substrate and a desired film thickness of the liquid to be applied thereto. Supply roller 50 comprises for instance a core of steel or aluminium which is covered for this purpose with a polymer top layer 55 for an optimal contact with the substrate 1. The polymer top layer 55 for instance likewise comprises an optionally natural rubber, and provides the supply surface 55 which is in constant contact with the substrate 1.

Due to the rotating contact with intermediate roller 40, supply roller 50 continuously takes on the liquid layer lying on the peripheral surface 44 of the intermediate roller therefrom and then deposits it on substrate 1. For this purpose a mutual difference in speed varying in the order of 50% to 150% can be imparted between intermediate roller 40 and supply roller 50 by control 100. The peripheral speed of supply roller 50 will here usually be adapted to the web speed of the substrate. The final layer thickness of the liquid applied to substrate 1 can thus be chosen within a practical range and can be controlled from the control, and determines the volume flow which must be displaced through the coating assembly 30, 40, 50.

It is important for this layer thickness, and so this volume flow, to be constant during the process. The volume flow is imparted to pump 15 as setpoint SP and follows from the product of the web speed (v) and the width (b) of the substrate and the desired layer thickness of liquid per square metre (d) of the liquid film: SP=(v)×(b)×(d) [ml/s]. This setpoint SP can be set manually by a corresponding adjustment of the pump, or be controlled electronically, for instance from the controller.

When there is a balance in reservoir 20 between the incoming liquid flow from pump 15 and the outgoing liquid flow due to net take-up of liquid by take-up roller 30, the liquid level LS in the reservoir will remain unchanged. Controller 100 continuously receives a signal LS from the level detector 25 and is able on the basis of this signal to monitor the liquid level in reservoir 20 and, if necessary, control the coating means 30, 40, 50 so that the two liquid flows are always equal to each other and the liquid level is maintained at a fixed value. For this purpose control 100 can control the actuator 60 to apply more or less contact pressure between take-up roller 30 and intermediate roller 40, which will result in less or more transfer of liquid. The rotational speed of intermediate roller 40 can also be adjusted by control 100 by controlling drive 140 correspondingly. The ratio of the peripheral speed of the take-up roller and that of the intermediate roller imposed thereby likewise has consequences for the degree to which the liquid will be transferred from take-up roller 30 or intermediate roller 40 per unit of time, and thereby for the outgoing liquid flow.

By thus monitoring the liquid level LS in reservoir 20 and keeping it constant, optionally by adjusting one or more of the actuator 60 and the drive 140, controller 100 controls the outgoing liquid flow at the set setpoint SP, on the basis of which the liquid coating deposited on substrate 1 can thus be imposed and set within narrow tolerances according to the above stated comparison.

Figure 2:
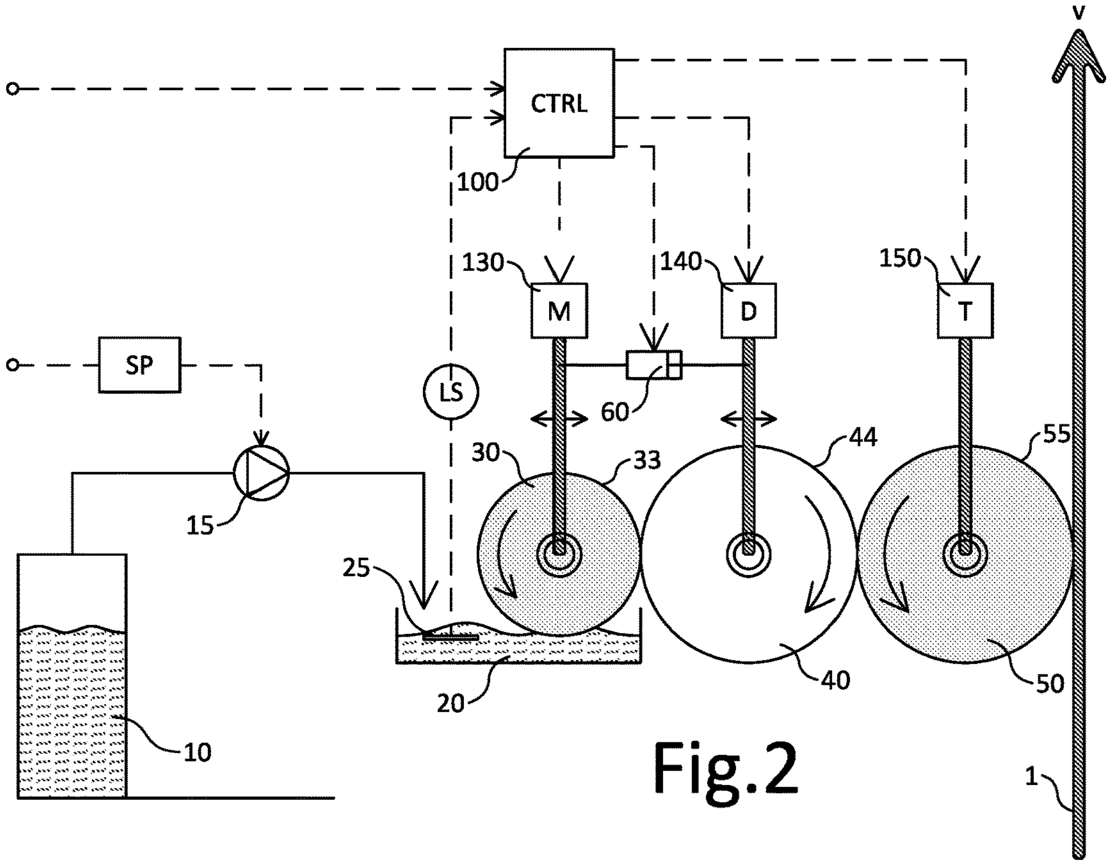
FIG. 2 shows a second exemplary embodiment of the coating device according to the invention.

A second embodiment of the coating device according to the invention is shown in FIG. 2. This embodiment largely corresponds to the first one, but the controller is here moreover operatively coupled to the drive 130 of take-up roller 30 and the drive 150 of supply roller 50. A more accurate and broader adaptation of the peripheral speed ratio of take-up roller 30 and intermediate roller 40 is thus possible, and an accurate adaptation and adjustment of the successive rotational speeds in relation to the web speed (v) of substrate 1 is furthermore possible. A ratio of the peripheral speed of intermediate roller 40 and supply roller 50 is now particularly also adjustable and controllable independently of the corresponding peripheral speed ratio of take-up roller 30 and intermediate roller 40. In this embodiment the contact pressure between take-up roller 30 and intermediate roller 40 is additionally also adjustable and controllable from control 100.

Figure 3:
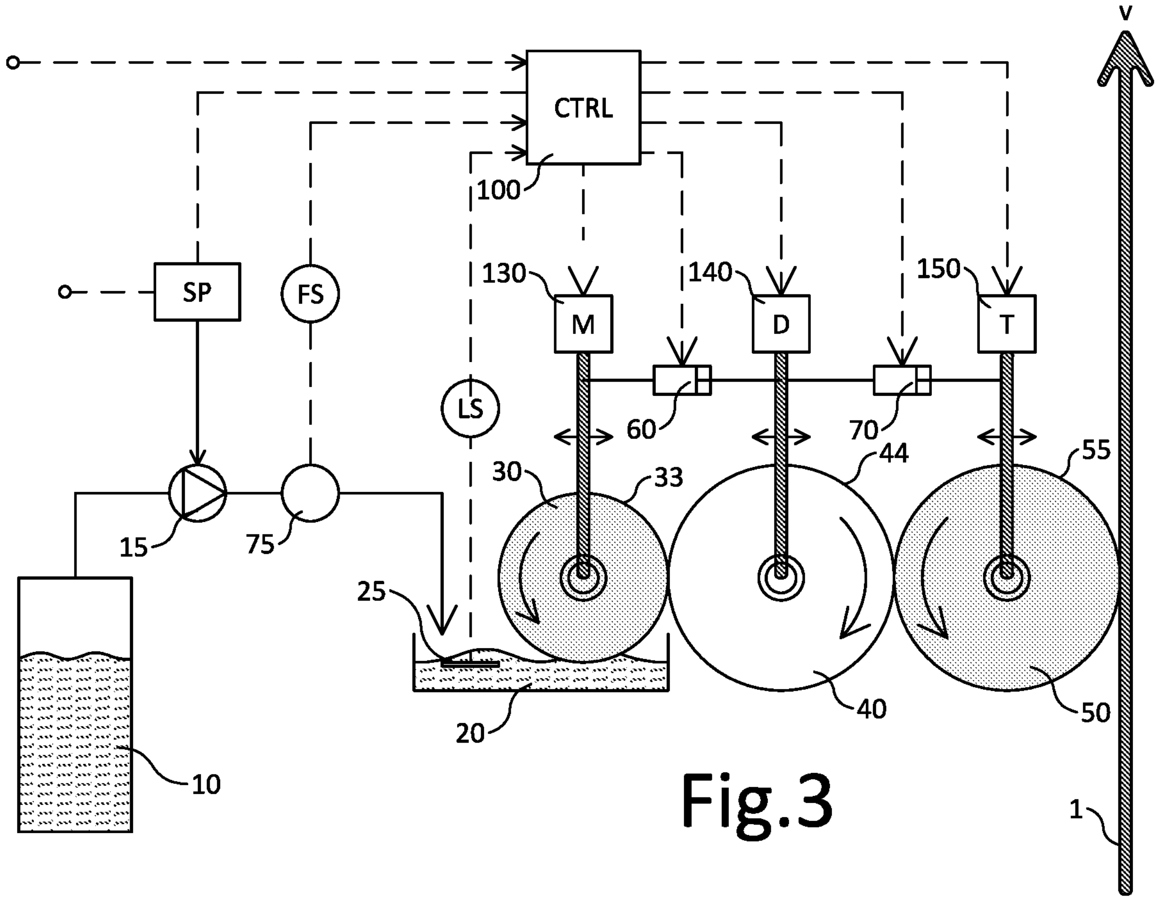
FIG. 3 shows a third exemplary embodiment of the coating device according to the invention.

In a third embodiment of the coating device according to the invention, which is shown in FIG. 3, the system has been expanded with at least one linear actuator 70 which is arranged between the rotation shafts of intermediate roller 40 and supply roller 50. This actuator also comprises a hydraulic cylinder, although, as for the other actuator 60, a different type of actuator can also be applied for this purpose, such as for instance a different type of pressure cylinder or a motorized screw spindle/threaded cavity assembly. Actuator 70 is operatively coupled to control 100, which means that the operation of actuator 70 is controlled and tracked wholly by control 100. This also makes the mutual contact pressure between intermediate roller 40 and supply roller 50 controllable and optionally adjustable. Also applied here in the supply conduit to the reservoir is a flow sensor 75 which is operatively coupled to control 100. The flow sensor detects a current magnitude of the liquid flow and generates this as signal FS to control 100, which compares it to the set setpoint SP. Pump 15 is also coupled to control 100 and can thus be adjusted, if necessary.

Although the invention has been further elucidated above on the basis of only several exemplary embodiments, it will be apparent that the invention is by no means limited thereto. On the contrary, many variations and embodiments are still possible within the scope of the invention for a person with ordinary skill in the art. In the embodiments use is thus made of a system with an intermediate roller between the take-up roller and the supply roller, but the invention can also be applied without such an intermediate roller and even if the coating means were to comprise only the take-up roller. The transport system of the substrate can also be coupled to the control so that the web speed is also known in the control as setting and parameter. Besides application for a substrate in the form of a continuous paper web with a web speed, the coating device can also be applied to individual, successive substrates. In addition to being provided on one side, the device can moreover also be provided on two sides of the substrate with coating means in order to provide both sides of the substrate with optionally the same liquid coating in a single pass.

The embodiment is based on a tuning of the coating means by means of the control on the basis of a constant liquid level in the reservoir, but it is also possible to tune on the basis of a constant drop of this level per unit of time. The control however preferably ensures that the liquid level in the reservoir is continuously monitored and maintained at a constant, fixed value. If this is the case, a balance can be brought about between the liquid flow to the reservoir and the liquid flow from the reservoir to the substrate. In this situation the coverage on the substrate is in accordance with the setpoint, whereby the setpoint imposed on the pump finally results in a constant, uniform layer thickness of the liquid layer which is deposited on the substrate, which can be set differently during operation, if desired.

The invention claimed is:

1. Coating device for supplying a liquid to a substrate, comprising: a reservoir for holding a quantity of liquid, coating means which are able and configured to take liquid from the reservoir and transfer it to the substrate, and supply means for delivering the liquid into the reservoir during operation, wherein the supply means comprise controllable supply means which are able and configured to lead a constant liquid flow into the reservoir, wherein the reservoir is provided with level detecting means which are able and configured to detect a height of a liquid level in the reservoir, wherein provided between the level detecting means and the coating means is a control which continuously controls the coating means during operation on the basis of the detection of the liquid level in the reservoir by the level detecting means, wherein the coating means comprise a take-up roller having over a periphery thereof a take-up surface intended and configured to enter into contact with the liquid and take up a quantity thereof during operation, wherein the coating means comprise a supply roller having over a periphery thereof a supply surface which is able and configured to enter into contact with the substrate and supply a quantity of the liquid thereto during operation, wherein at least one of the take-up roller and the supply roller is in contact with a counter roller, wherein at least one actuator is provided between said counter roller and said at least one of the take-up roller and the supply-roller which, at least during operation, applies a contact pressure between said counter roller and said at least one of the take-up roller and the supply-roller, and wherein the control is operatively coupled to the at least one actuator in order to apply a mutual contact pressure between said counter roller and said at least one of the take-up roller and the supply-roller.

2. Coating device according to claim 1, wherein the control controls the coating means on the basis of a detection of the liquid level in the reservoir by the level detecting means in order to maintain the liquid level (s) at a fixed flow rate.

3. Coating device according to claim 1, wherein the control controls the coating means on the basis of a detection of the liquid level in the reservoir by the level detecting means in order to maintain the liquid level (s) at a fixed value.

4. Coating device according to claim 1, wherein the take-up roller is driven rotatably about its central axis and wherein the control is operatively coupled to a drive of the take-up roller so as to impart thereto a rotation speed.

5. Coating device according to claim 4, wherein said counter-roller comprises over a periphery thereof a take-off surface, wherein said counter-roller extends at least substantially parallel to the take-up roller and is at least substantially in contact with the take-up roller such that the take-off surface of the counter-roller co-acts with the take-up surface of the take-up roller during operation in order to take off a quantity of liquid therefrom, wherein each of the take-up roller and the counter-roller is driven rotatably about its central axis and wherein the control is operatively coupled to a drive of at least one of the take-up roller and the counter-roller and imposes an adaptation of a mutual difference between a rotation speed of the take-up roller and a rotation speed of the counter-roller.

6. Coating device according to claim 1, wherein the supply roller is driven rotatably about its central axis.

7. Coating device according to claim 6, wherein transport means are provided to guide the substrate over the supply surface of the supply roller at a web speed, and wherein the control is operatively coupled to at least one of a drive of the supply roller and the transport means and imposes an adaptation between a rotation speed of the supply roller and the web speed of the substrate.

8. Coating device according to claim 1, wherein the supply roller is coupled for liquid transfer to the take-up roller with interposing of at least one intermediate roller, wherein the supply roller extends at least substantially parallel to the intermediate roller and is placed at least substantially thereagainst, such that the supply surface of the supply roller co-acts with a peripheral surface of the intermediate roller during operation in order to take on a quantity of liquid therefrom.

9. Coating device according to claim 8, wherein each of the supply roller and the intermediate roller is driven rotatably about its central axis and wherein the control is coupled to a drive of at least one of the supply roller and the intermediate roller, and imposes an adaptation of a mutual difference between a rotation speed of the supply roller and a rotation speed of the intermediate roller.

10. Coating device according to claim 8, wherein said at least one actuator is provided between the supply roller and the intermediate roller and, at least during operation, implies a contact pressure between the supply surface and the peripheral surface, and wherein the control is coupled to the at least one actuator in order to apply a mutual contact pressure between the supply roller and the intermediate roller.

11. Coating device according to claim 8, wherein the take-up roller and the supply roller comprise at respectively the take-up surface and supply surface a polymer top layer, and wherein the intermediate roller comprises a peripheral surface of metal.

12. Coating device according to claim 11, wherein the intermediate roller comprises a peripheral surface of ceramic material or steel, with a pattern of indentations.

13. Coating device according to claim 1, wherein the supply means comprise a controllable pump.

14. Coating device according to claim 13, wherein the controllable pump is operatively coupled to the control and is controlled thereby.

15. Coating device according to claim 1, wherein the supply means comprise a controllable supply conduit to the reservoir.

16. Coating device according to claim 15, wherein the controllable supply conduit is operatively connected to the control and is controlled thereby.

17. Coating device according to claim 1, wherein the level detecting means comprise at least one sensor from a group consisting of an ultrasonic sensor, an optical sensor, a magnetic sensor, a weight sensor and a float.

18. Coating device according to claim 11, wherein said polymer top layer comprises a synthetic or natural rubber.

19. Coating device according to claim 11, wherein said metal is steel.

20. Coating device according to claim 19, wherein said steel is stainless steel.

21. Coating device according to claim 13, wherein said controllable pump is a columetrically controllable pump.

* * * * *